United States Patent
Lao et al.

(10) Patent No.: US 6,846,186 B2
(45) Date of Patent: Jan. 25, 2005

(54) BGA MEMORY MODULE WITH BATTERY PACK

(75) Inventors: Tom Lao, Murphy, TX (US); Krishnan Kelappan, Carrollton, TX (US); Mike Hundt, Double Oak, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 10/135,742

(22) Filed: Apr. 30, 2002

(65) Prior Publication Data

US 2003/0201751 A1 Oct. 30, 2003

(51) Int. Cl.⁷ ................................................. H01R 9/09
(52) U.S. Cl. ........................... 439/70; 439/73; 439/573; 439/948; 257/924; 429/99
(58) Field of Search .......................... 439/500, 69, 70, 439/73, 573, 948; 361/735, 790, 785; 257/686, 924; 429/99, 100

(56) References Cited

U.S. PATENT DOCUMENTS 4,381,458 A * 4/1983 Anstey et al. ................ 307/66
5,570,273 A * 10/1996 Siegel ......................... 361/773
5,994,774 A * 11/1999 Siegel et al. ................ 257/727
6,020,634 A * 2/2000 Gerber et al. ............... 257/726

* cited by examiner

Primary Examiner—Neil Abrams
(74) Attorney, Agent, or Firm—Lisa K. Jorgenson; William A. Munck

(57) ABSTRACT

A battery pack for two 2032 batteries includes a molded plastic base having an upper surface on which the batteries are received and columnar standoff posts projecting from a bottom surface, as well as a molded plastic housing sized to receive the batteries and an upper portion of the base and having ears through which screws are passed to be received by press-fit threaded inserts mounted on an integrated circuit packaging substrate and tightened to a predetermined torque. Like terminals of the batteries are joined by a welded plate, with conductive pins connected to each plate extending through the base and projecting from a bottom surface of the battery pack. A mounting guide ensures connection of proper pins to corresponding receptacles of an integrated circuit packaged during mounting of the battery pack on the integrated circuit packaging substrate.

20 Claims, 6 Drawing Sheets

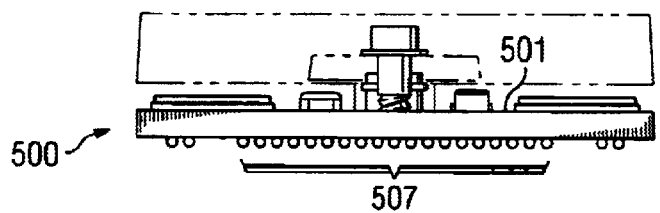
*FIG. 5B*
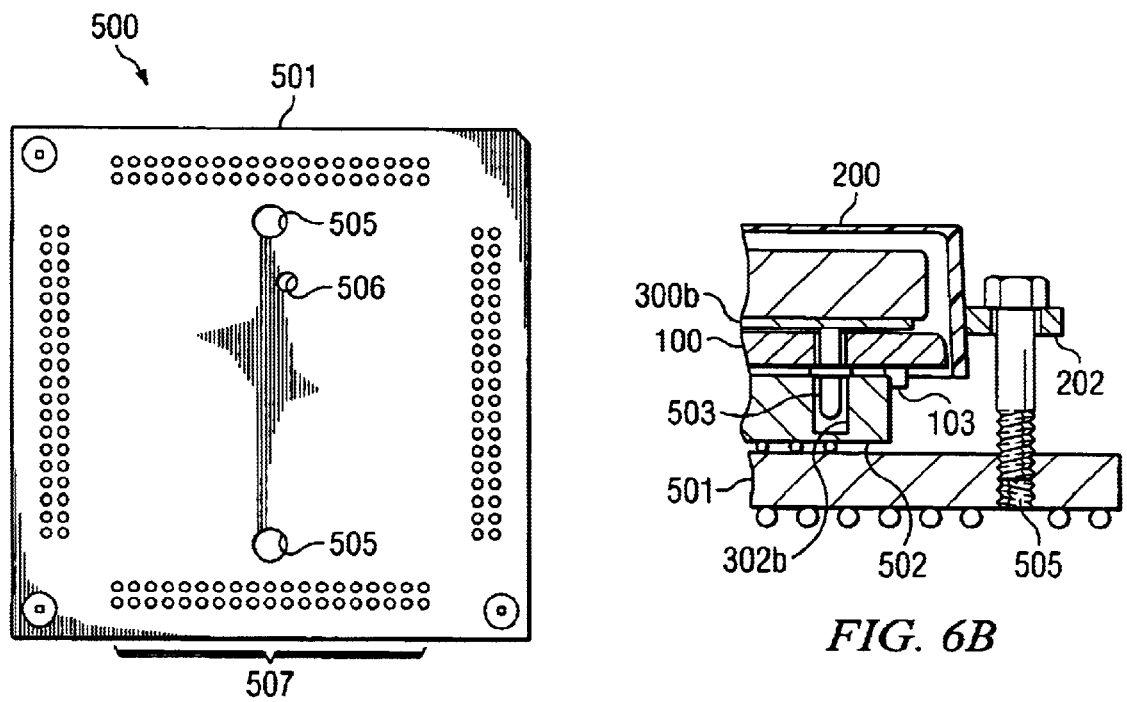
*FIG. 5C*
*FIG. 6B*
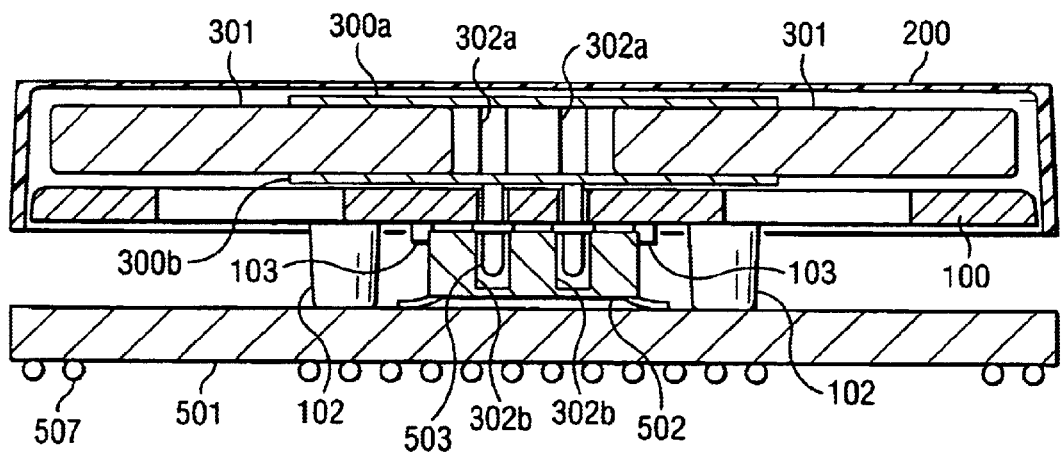
*FIG. 6A*

BGA MEMORY MODULE WITH BATTERY PACK

TECHNICAL FIELD OF THE INVENTION

The present invention is directed, in general, to integrated circuit packaging and, more specifically, to surface mount integrated circuit packages with battery packs.

BACKGROUND OF THE INVENTION

Battery powered or, more commonly, battery-backed integrated circuits are employed in a variety of situations. Battery packs for surface mount integrated circuit packages have been designed, some employing custom profile batteries with snap lock attachment. However, the custom batteries employed for such purposes are substantially more expensive than most commercial (e.g., lithium) batteries employed for electronics.

There is, therefore, a need in the art for an improved battery pack for surface mount integrated circuit packages which allows general purpose commercial batteries to be employed in providing back-up power.

SUMMARY OF THE INVENTION

To address the above-discussed deficiencies of the prior art, it is a primary object of the present invention to provide, for use in a battery-powered or battery-backed integrated circuit package, a battery pack for two 2032 batteries which includes a molded plastic base having an upper surface on which the batteries are received and columnar standoff posts projecting from a bottom surface, as well as a molded plastic housing sized to receive the batteries and an upper portion of the base and having ears through which screws are passed to be received by press-fit threaded inserts mounted on an integrated circuit packaging substrate and tightened to a predetermined torque. Like terminals of the batteries are joined by a welded plate, with conductive pins connected to each plate extending through the base and projecting from a bottom surface of the battery pack. A mounting guide ensures connection of proper pins to corresponding receptacles during mounting of the battery pack on the integrated circuit packaging substrate.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIGS. 5A through 5C are top plan, side elevation and bottom plan views, respectively, of an integrated circuit packaging receiving a battery pack according to one embodiment of the present invention.

FIGS. 6A and 6B are aside cross-sectional view and a partial end cross-sectional view, respectively, of an assembled battery pack attached to an integrated circuit package according to one embodiment of the present invention.

DETAILED DESCRIPTION OF THE INVENTION

FIGS. 1 through 5C, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1A:
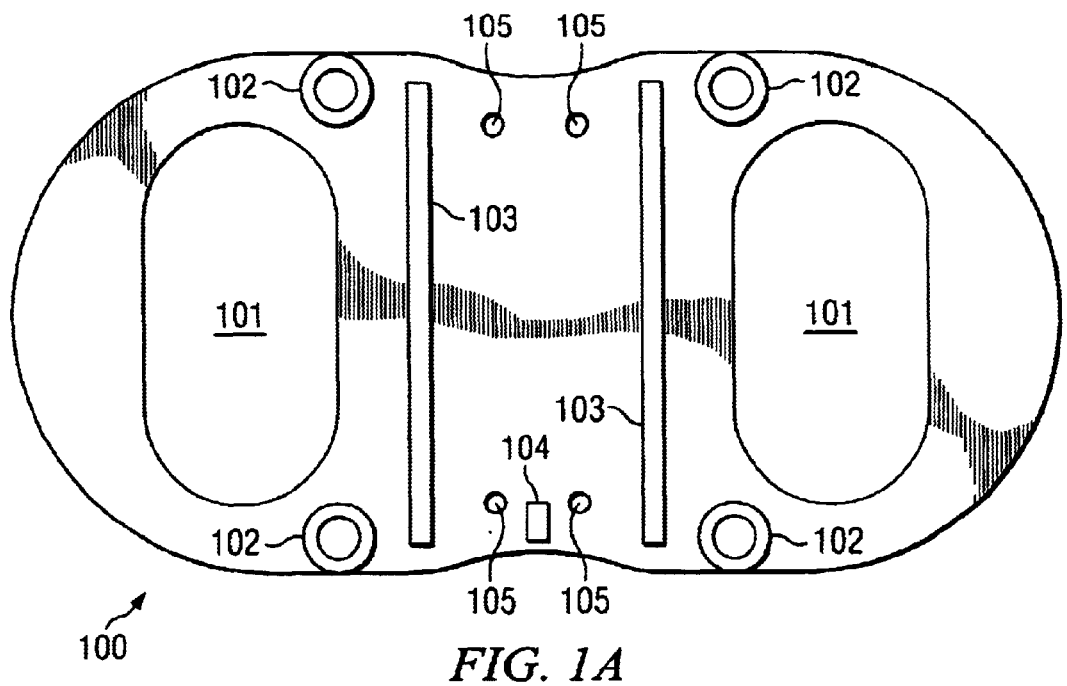
FIGS. 1A through 1C are bottom plan, side and end views, respectively, of a base for a battery pack according to one embodiment of the present invention.
Figure 1B:
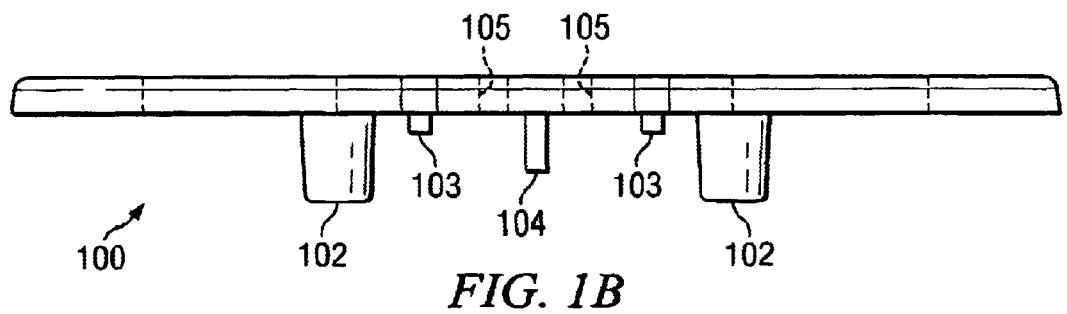
Figure 1C:
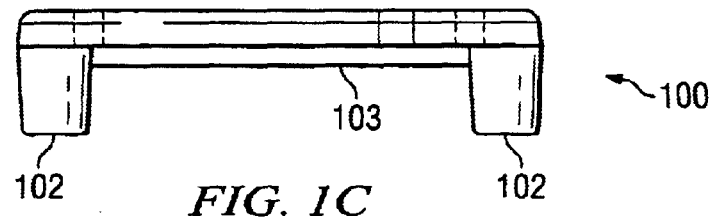

FIGS. 1A through 1C are bottom plan, side and end views, respectively, of a base for a battery pack according to one embodiment of the present invention. Base 100 has an injection molded plastic body sized to receive two 2032 batteries on an upper surface thereof and including two openings 101 in the example shown. Base 100 also includes integral columnar standoff posts 102, rails 103 and a mounting guide 104 projecting from a bottom surface thereof. In addition, the body of base 100 includes four holes 105 for receiving conductive (e.g., gold-plated) pins that will provide electrical connection of the integrated circuits to the batteries.

Figure 2A:
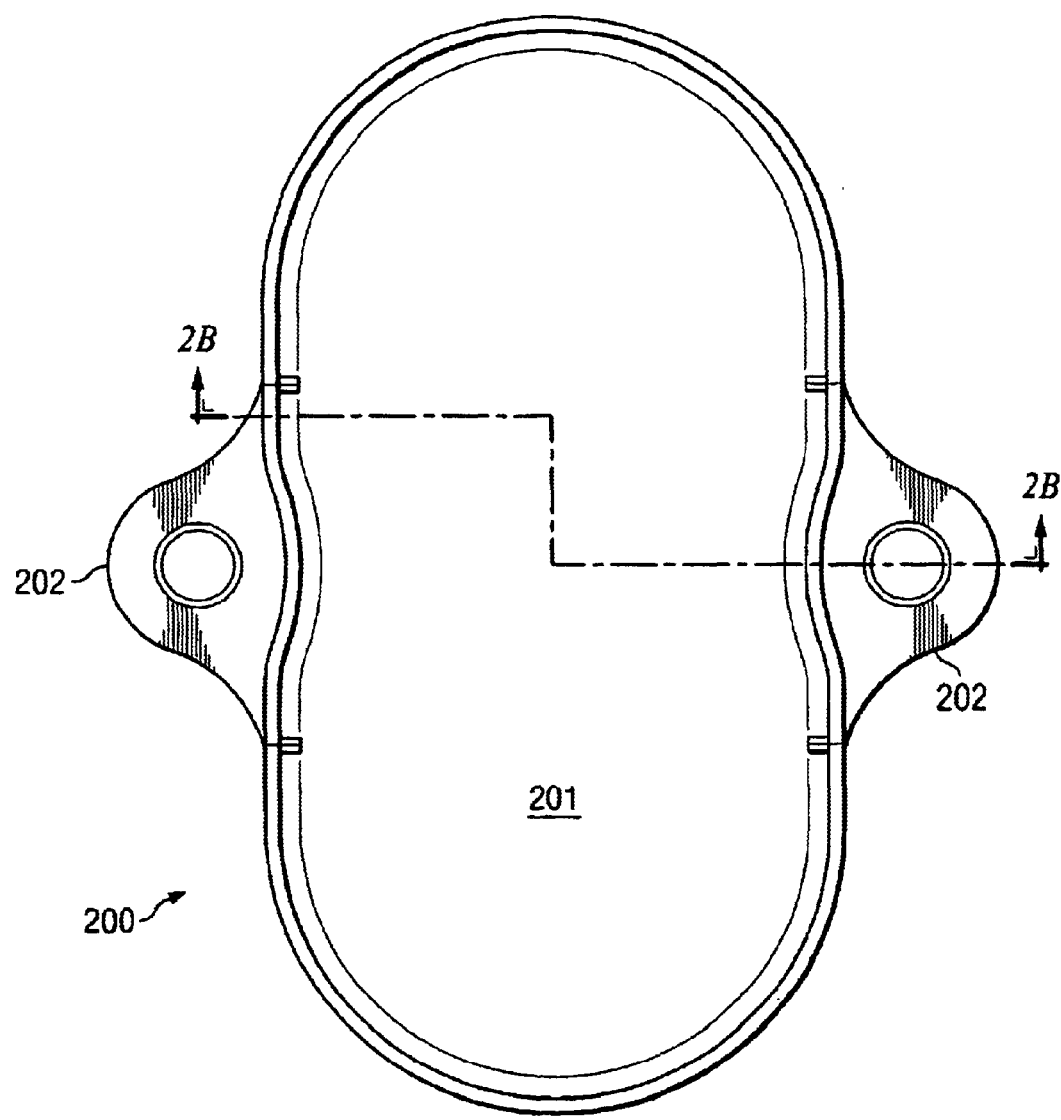
FIGS. 2A through 2C are bottom plan, cross-sectional and side views, respectively, of a housing for a battery pack according to one embodiment of the present invention.
Figure 2B:
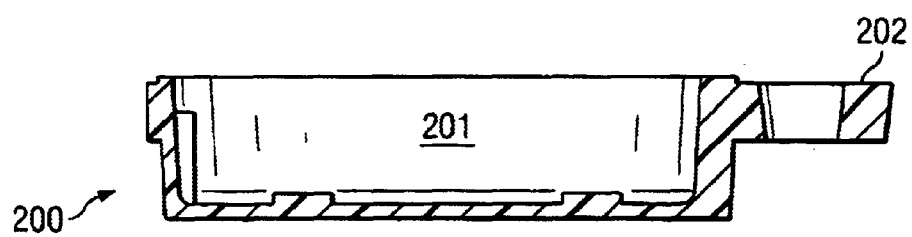
Figure 2C:
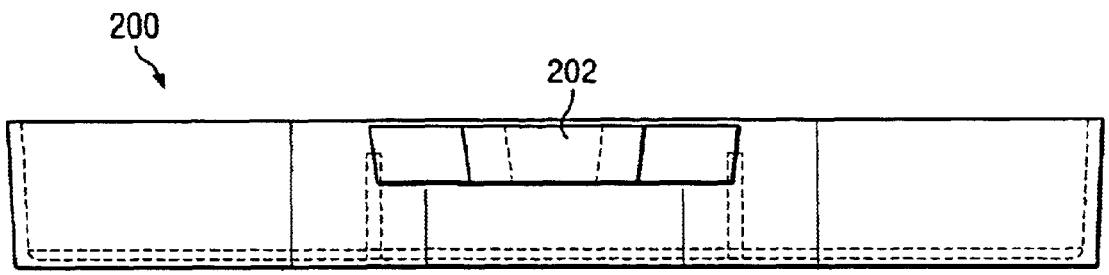

FIGS. 2A through 2C are bottom plan, cross-sectional and side views, respectively, of a housing for a battery pack according to one embodiment of the present invention. Housing 200 includes an oblong central cavity 201 defined by the sidewalls and roof of the housing and sized to receive the two 2032 batteries and a portion of base 100. Ears 202 project from the sides of the housing 200 and include openings for receiving the screws which will secure the battery pack to the integrated circuit packaging substrate.

Figure 3A:
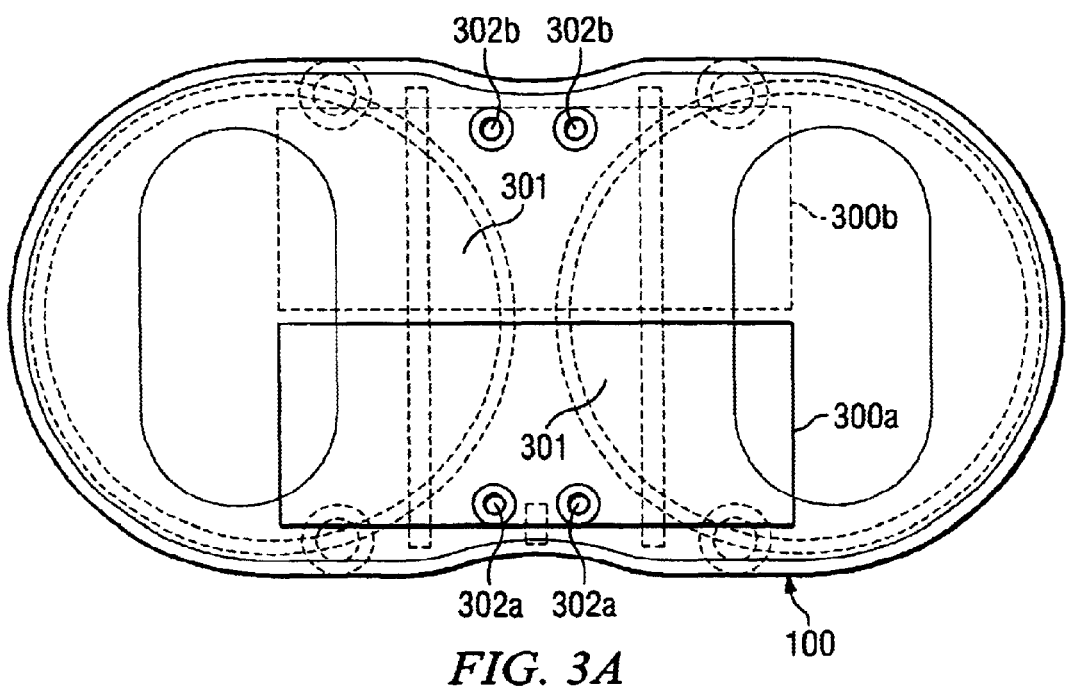
FIGS. 3A through 3C are top plan, side elevation and end elevation views, respectively, of a completed base for a battery pack with batteries mounted thereon according to one embodiment of the present invention.
Figure 3B:
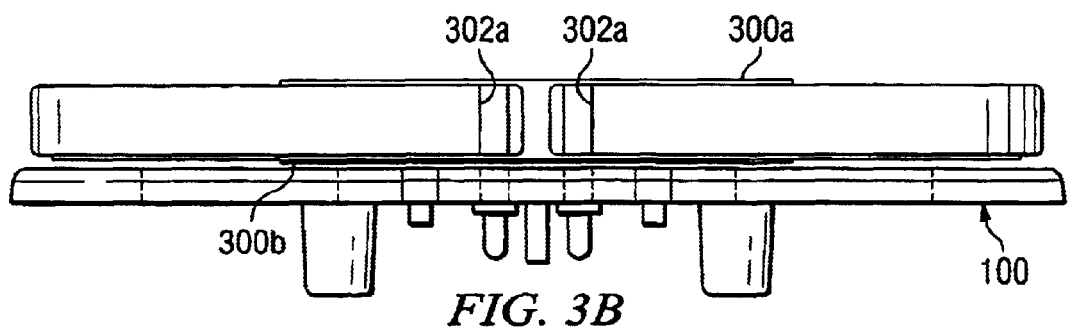
Figure 3C:
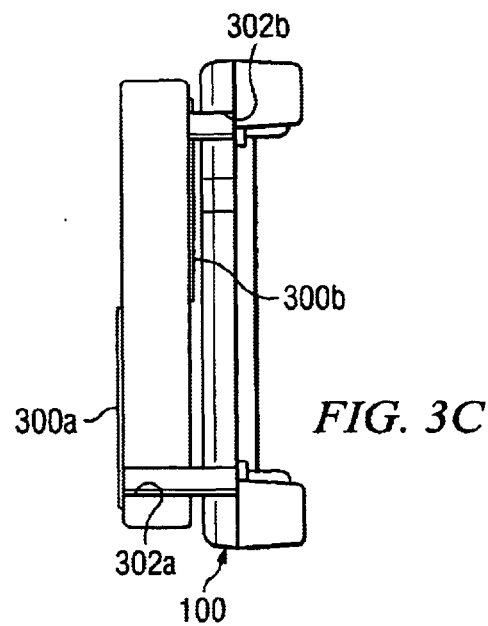

FIGS. 3A through 3C are top plan, side elevation and end elevation views, respectively, of a completed base for a battery pack with batteries mounted thereon according to one embodiment of the present invention. The base 100 is shown with two 2032 batteries (shown in phantom as dashed circles in the plan view) mounted on the upper surface thereof with the positive terminals up. Rectangular plates 300a and 300b electrically join the positive and negative terminals of the two batteries, offset and welded to the battery surfaces at weld locations 301. Conductive pins 302a and 302b connect to the plates 300a and 300b, respectively, with pins 302a connecting to the plate 300a joining the batteries' positive terminals being longer than pins 302b connecting to plate 300b joining the batteries' negative terminals. Each of the conductive pins extends through a corresponding opening through base 100 and projects, with a rounded tip, below a bottom surface of base 100.

Figure 4A:
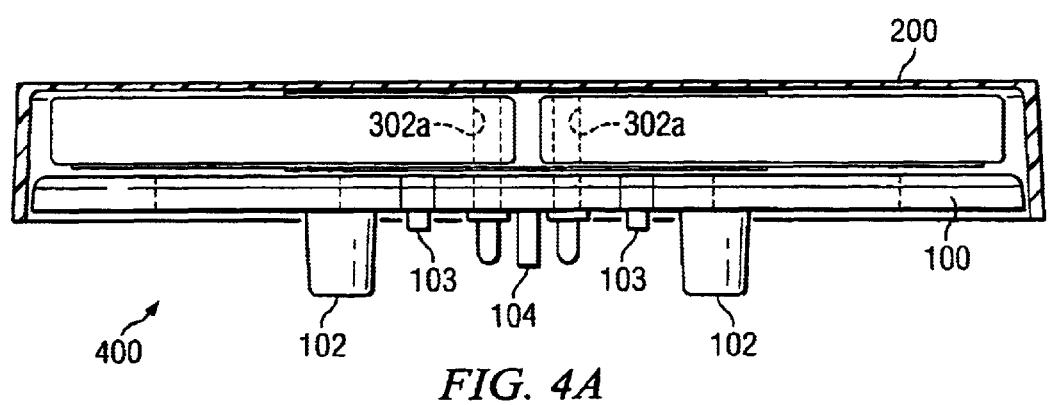
FIGS. 4A and 4B are side and bottom views of a battery pack according to one embodiment of the present invention.
Figure 4B:
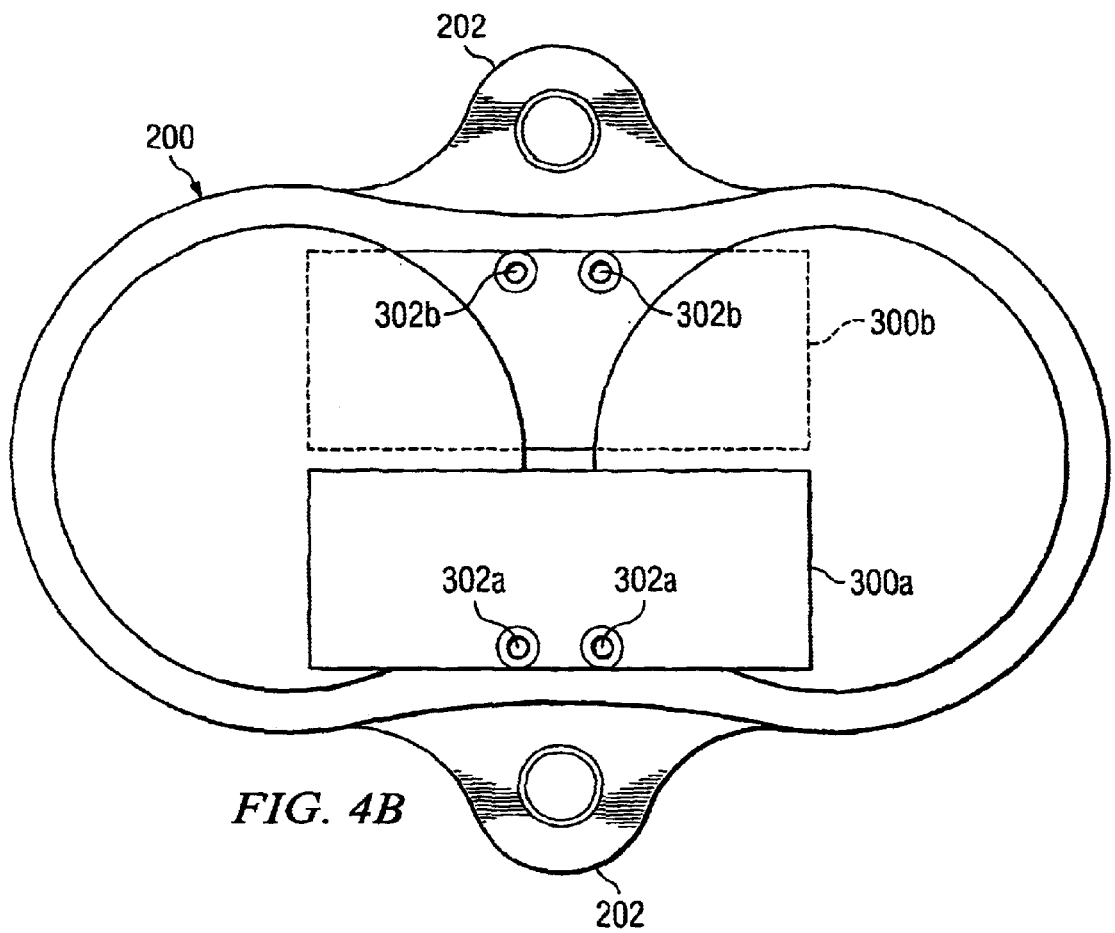

FIGS. 4A and 4B are side and bottom views of a battery pack according to one embodiment of the present invention. The two 2032 batteries (again shown in phantom) and the joining plates are received on an upper surface of base 100 and within the cavity in housing 200, which also receives the upper portion of base 100, excluding the standoff posts 102, rails 103, mounting guide 104, and the projecting ends of the conductive pins 302a and 302b. The components of battery pack 400 may be secured together by an epoxy injected through the openings (not shown in FIGS. 4A and 4B, but correponding to openings 101 in FIG. 1A) within base 100 to sealingly encapsulate the internal portion thereof.

Figure 5A:
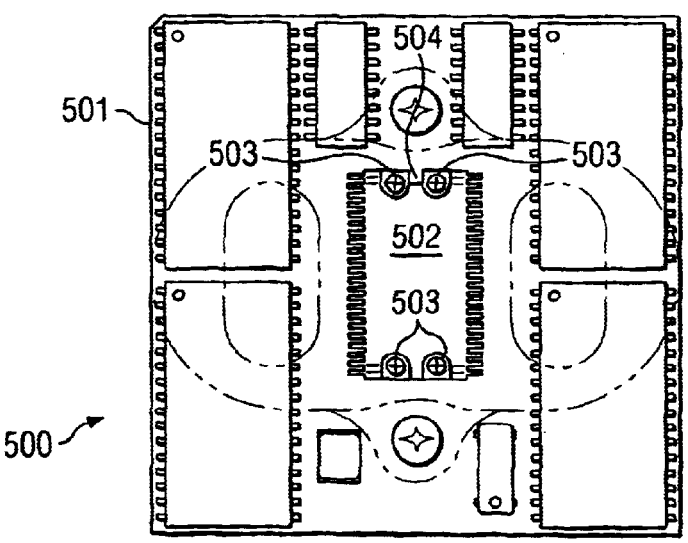

FIGS. 5A through 5C are top plan, side elevation and bottom plan views, respectively, of an integrated circuit packaging receiving a battery pack according to one embodiment of the present invention. The integrated circuit package 500 is formed with a printed circuit board packaging substrate 501 having conductive traces on one or both sides thereof, and having one or more electronic components mounted on an upper surface thereof. The battery pack and related screws are shown in phantom.

In the example shown, the electronic components on the upper surface of packaging substrate 501 includes a power management dual in-line package (DIP) integrated circuit 502 having receptacles 503 for receiving the conductive pins protruding from the bottom surface of the battery pack 400 and electrically coupled to the power management integrated circuit therein. Power management integrated circuit 502 also includes a guide groove 504 for receiving the mounting guide 104 protruding from the bottom surface of the battery pack 400, ensuring that the battery pack is mounted with the correct pins (positive or negative) received by the correct receptacles. The rails projecting from the bottom of the battery pack are aligned outside the long edges of power management integrated circuit 502.

The four standoff posts on the bottom of the battery pack are received on an upper surface of packaging substrate 501, limiting the load on the packaging substrate 501 and holding the battery pack over the power management integrated circuit 502. Packaging substrate 501 also includes openings 505 for receiving PEM-type press-fit threaded inserts. The battery pack is secured to the packaging substrate 501 by screws through the ears on the battery pack housing received by the press-fit threaded inserts, with the screws tightened to a predetermined torque.

Packaging substrate 501 in the exemplary embodiment further includes an opening 506 aligned with one receptacle for the conductive pins, allowing connection of that pins to, for example, a common ground. Balls or lands 507 project from a bottom surface of packaging substrate 501, by which electrical connection of the assembly may be made by conventional means.

FIGS. 6A and 6B are a side cross-sectional view and a partial end cross-sectional view, respectively, of an assembled battery pack attached to an integrated circuit package according to one embodiment of the present invention.

The present invention allows a battery pack employing commercial batteries to be mounted on a ball (or land) grid array integrated circuit package while occupying a minimal amount of surface area. The battery pack is easily removed and replaced without replacing the entire integrated circuit package.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A battery pack for battery-powered or battery-back integrated circuits comprising:
    a base sized to receive one or more batteries on an upper surface thereof, having a plurality of standoff posts and a mounting guide projecting from a bottom surface thereof, and having openings for electrically connecting to the one or more batteries; and
    a housing sized to receive the one or more batteries and a portion of the base, the housing including ears for use in securing the battery pack to an integrated circuit packaging substrate.

2. The battery pack according to claim 1, wherein the base and the housing are sized to receive two 2032 batteries.

3. The battery pack according to claim 1, further comprising:
    conductive pins extending through the openings for connecting to the one or more batteries within the base and connected to the one or more batteries, the conductive pins projecting from a bottom surface of the base.

4. The battery pack according to claim 1,
    wherein the mounting guide projecting from the bottom surface of the base is positioned at a predetermined location with respect to both one or more of the conductive pins connected to a positive terminal of the one or more batteries and one or more of the conductive pins connected to a negative terminal of the one or more batteries, wherein the mounting guide is adapted to ensure that the conductive pins are received in proper receptacles associated with the integrated circuit packaging substrate during mounting of the battery pack on the integrated circuit packaging substrate.

5. The battery pack according to claim 1, wherein the ears of the housing are positioned to receive screws that are employed, together with press-fit threaded inserts secured to the integrated circuit packaging substrate, to secure the battery pack to the integrated circuit packaging substrate.

6. The battery pack according to claim 1, wherein the standoff posts hold the battery pack over a power management integrated circuit mounted on the integrated circuit packaging substrate.

7. The battery pack according to claim 1, wherein the integrated circuit packaging substrate includes balls or lands on a bottom surface thereof.

8. A battery-powered or battery-back integrated circuit package comprising:

a integrated circuit packaging substrate having at least one integrated circuit mounted on an upper surface thereof; and a battery pack comprising:

a base sized to receive one or more batteries on an upper surface thereof, having a plurality of standoff posts and a mounting guide projecting from a bottom surface thereof, and having openings for electrically connecting to the one or more batteries; and a housing sized to receive the one or more batteries and a portion of the base, the housing including ears for use in securing the battery pack to the integrated circuit packaging substrate.

9. The integrated circuit package according to claim 8, wherein the base and the housing are sized to receive two 2032 batteries.

10. The integrated circuit package according to claim 8, wherein the battery pack further comprises:

conductive pins extending through the openings for connecting to the one or more batteries within the base and connected to the one or more batteries, the conductive pins projecting from a bottom surface of the base.

11. The integrated circuit package according to claim 8, wherein the mounting guide projecting from the bottom surface of the base is positioned at a predetermined location with respect to both one or more of the conductive pins connected to a positive terminal of the one or more batteries and one or more of the conductive pins connected to a negative terminal of the one or more batteries, wherein the mounting guide is adapted to ensure that the conductive pins are received in proper receptacles associated with the integrated circuit packaging substrate during mounting of the battery pack on the integrated circuit packaging substrate.

12. The integrated circuit package according to claim 8, wherein the ears of the housing are positioned to receive screws that are employed, together with press-fit threaded inserts secured to the integrated circuit packaging substrate, to secure the battery pack to the integrated circuit packaging substrate.

13. The integrated circuit package according to claim 8, wherein the standoff posts hold the battery pack over a power management integrated circuit mounted on the integrated circuit packaging substrate.

14. The integrated circuit package according to claim 8, wherein the integrated circuit packaging substrate includes balls or lands on a bottom surface thereof.

15. A method of packaging battery-powered or battery-back integrated circuits comprising:

providing a base sized to receive one or more batteries on an upper surface thereof, having a plurality of standoff posts and a mounting guide projecting from a bottom surface thereof, and having openings for electrically connecting to the one or more batteries; and providing a housing sized to receive the one or more batteries and a portion of the base, the housing including ears for use in securing the battery pack to an integrated circuit packaging substrate.

16. The method according to claim 15, wherein the base and the housing are sized to receive two 2032 batteries.

17. The method according to claim 15, further comprising:

providing conductive pins extending through the openings for connecting to the one or more batteries within the base and connected to the one or more batteries, the conductive pins projecting from a bottom surface of the base.

18. The method according to claim 15, further comprising:

providing the mounting guide projecting from the bottom surface of the base at a predetermined location with respect to both one or more of the conductive pins connected to a positive terminal of the one or more batteries and one or more of the conductive pins connected to a negative terminal of the one or more batteries, wherein the mounting guide is adapted to ensure that the conductive pins are received in proper receptacles associated with the integrated circuit packaging substrate during mounting of the battery pack on the integrated circuit packaging substrate.

19. The method according to claim 15, wherein the ears of the housing are positioned to received screws that are employed, together with press-fit threaded inserts secured to the integrated circuit packaging substrate, to secure the battery pack to the integrated circuit packaging substrate.

20. The method according to claim 15, wherein the standoff posts hold the battery pack over a power management integrated circuit mounted on the integrated circuit packaging substrate.

* * * * *